(12) United States Patent
Exnar et al.

(10) Patent No.: US 8,133,616 B2
(45) Date of Patent: Mar. 13, 2012

(54) LITHIUM MANGANESE PHOSPHATE POSITIVE MATERIAL FOR LITHIUM SECONDARY BATTERY

(75) Inventors: Ivan Exnar, Itingen (CH); Thierry Drezen, Cugy (CH); Nam Hee Kwon-Roth, Fribourg (CH); Motoshi Isono, Aichi (JP)

(73) Assignee: Dow Global Technologies LLC, Midland, MI (US)

( * ) Notice: Subject to any disclaimer, the term of this patent is extended or adjusted under 35 U.S.C. 154(b) by 713 days.

(21) Appl. No.: 12/279,469

(22) PCT Filed: Feb. 14, 2006

(86) PCT No.: PCT/IB2006/050483
§ 371 (c)(1),
(2), (4) Date: Oct. 23, 2008

(87) PCT Pub. No.: WO2007/093856
PCT Pub. Date: Aug. 23, 2007

(65) Prior Publication Data
US 2009/0130560 A1    May 21, 2009

(51) Int. Cl.
| | |
|---|---|
| *H01M 4/13* | (2010.01) |
| *H01M 4/50* | (2010.01) |
| *H01M 4/58* | (2010.01) |
| *H01M 6/18* | (2006.01) |
| *H01M 10/0562* | (2010.01) |
| *B01J 23/00* | (2006.01) |
| *B01J 23/32* | (2006.01) |
| *B01J 27/00* | (2006.01) |
| *B01F 3/12* | (2006.01) |
| *C09K 3/00* | (2006.01) |

(52) U.S. Cl. ............... 429/224; 429/231.95; 429/218.1; 429/306; 516/78; 516/88; 502/208; 502/300; 502/324

(58) Field of Classification Search .................. 429/224, 429/231.95, 218.1, 306; 516/78, 88; 502/208, 502/300, 324
See application file for complete search history.

(56) References Cited

U.S. PATENT DOCUMENTS

| | | | |
|---|---|---|---|
| 4,389,290 A | 6/1983 | Gratzel et al. | |
| 4,547,439 A | 10/1985 | Genies | |
| 5,084,365 A | 1/1992 | Gratzel et al. | |
| 5,441,827 A | 8/1995 | Gratzel et al. | |
| 5,442,197 A | 8/1995 | Andrieu et al. | |
| 5,482,570 A | 1/1996 | Saurer et al. | |
| 5,569,561 A | 10/1996 | Exnar et al. | |
| 6,024,807 A | 2/2000 | Pappas et al. | |

(Continued)

FOREIGN PATENT DOCUMENTS

CA    2 614 634    * 12/2007

(Continued)

OTHER PUBLICATIONS

"Effect of particle size on LiMnPO4 cathodes," Thierry Drezen et al. Journal of Power Sources 174 (2007), pp. 949-953.*

(Continued)

*Primary Examiner* — Patricia L Hailey
(74) *Attorney, Agent, or Firm* — Dobrusin & Thennisch PC (57) ABSTRACT

A process for the production of nano-structured olivine lithium manganese phosphate ($LiMnPO_4$) electrode material comprising of the following steps: sol gel preparation in a chelating environment; preparation of lithium manganese phosphate/carbon composite by ball-milling; and electrode preparation.

20 Claims, 4 Drawing Sheets

U.S. PATENT DOCUMENTS

| | | | |
|---|---|---|---|
| 6,067,184 A | 5/2000 | Bonhote et al. | |
| 6,235,182 B1 | 5/2001 | Bele et al. | |
| 6,475,663 B1 | 11/2002 | Möhwald et al. | |
| 6,528,033 B1* | 3/2003 | Barker et al. | 423/306 |
| 6,855,273 B2* | 2/2005 | Ravet et al. | 252/506 |
| 6,870,657 B1 | 3/2005 | Fitzmaurice et al. | |
| 7,390,472 B1* | 6/2008 | Singhal et al. | 423/306 |
| 7,718,319 B2* | 5/2010 | Manthiram et al. | 429/231.95 |
| 7,749,658 B2* | 7/2010 | Isono et al. | 429/224 |
| 7,785,740 B2 | 8/2010 | Amine et al. | |
| 7,824,802 B2* | 11/2010 | Zhang et al. | 429/218.1 |
| 2002/0071986 A1 | 6/2002 | Exnar et al. | |
| 2002/0081484 A1 | 6/2002 | Exnar et al. | |
| 2005/0053835 A1* | 3/2005 | Atsumi et al. | 429/218.1 |
| 2008/0107967 A1* | 5/2008 | Liu et al. | 429/219 |
| 2009/0123837 A1 | 5/2009 | Exnar et al. | |
| 2009/0130559 A1* | 5/2009 | Okada et al. | 429/224 |
| 2009/0130560 A1 | 5/2009 | Exnar et al. | |
| 2009/0176162 A1 | 7/2009 | Exnar et al. | |
| 2009/0186275 A1 | 7/2009 | Exnar et al. | |
| 2009/0197174 A1* | 8/2009 | Levassbur et al. | 429/224 |
| 2010/0081059 A1 | 4/2010 | Exnar et al. | |
| 2010/0178562 A1* | 7/2010 | Exnar et al. | 429/221 |
| 2011/0012067 A1* | 1/2011 | Kay | 252/507 |

FOREIGN PATENT DOCUMENTS

| | | | |
|---|---|---|---|
| EP | 1244168 A1 | | 9/2002 |
| JP | 2000294238 A2 | | 10/2000 |
| JP | 2010-073520 | * | 4/2010 |
| WO | 92/19092 A1 | | 10/1992 |
| WO | 2004/001881 A2 | | 12/2003 |
| WO | 2008/047324 A3 | | 4/2008 |

OTHER PUBLICATIONS

International Search Report for PCT/IB2006/050483 mailed Aug. 11, 2007.
Delacourt C et al. "One-Step Low-Temperature Route for the Preparation of Electrochemically Active LimnP04 Powders" Chemistry of Materials, American Chemical Society, Washington, US, vol. 16, No. 1, Dec. 12, 2003, pp. 93-99, XP002363774.
Yonemura, M. et al. "Comparative Kinetic Study of Olivine LixMP04 (M = Fe, Mn)" Journal of the Lectrochemical Society,vol. 151, No. 9, 2004, pp. A1352-A1356, XP002390225.
International Preliminary Report on Patentability (Chapter II) dated Sep. 3, 2008.
Croce, F., A Novel Concept for the Synthesis of an Improved LiFePO4 Lithium Battery Cathode, Electrochemical and Solid-State Letters. 5(3) A47-A50 (2002).
Delacourt, C., One Step Low-Temperature Route for the Preparation of Electrochemically Active LiMnPO4 Powders, Chem. Mater. 2004, 16, 93-99.
Doeff, M. M., Effect of Surface Carbon Structure on the Electrochemical performance of LiFePO4, Electrochemical and Solid State Letters 6 (10) A207-A209 (2003).
Hsu, K.F., Synthesis and Characterization at nano-sized LiFePO4 Cathode Materials Prepared by a Citric Acid-Based Sol-Gel Route, Journal of Materials Chemistry, www.rsc.org/materials, May 5, 2004.
Hu, Electrochemical Performance of Sol-Gel Synthesized LiFePO4 in Lithium Batteries, Journal of The Electrochemical Society, 151 (8) A1279-A1285 (2004).
MA, J., Electrochemical Performance of Nanocrystalline LiMPO4 Thin-Films Prepared By Electrostatic Spray Deposition available online a www.sciencedirect.com, Journal of Power Sources 48 (2005) 66 71.
CN 1410349, Filed Apr. 16, 2003, XP-002392552, (c) WPI/DERWENT.
Yonemura, M., Comparative Kinetic Study of Olivine Li1MPO4 (M=Fe,Mn), Journal of the Electrochemical Society, 151 (9) A1352-A1356 (2004).
Copending U.S. Appl. No. 12/440,628, filed Oct. 23, 2009 (Published as 2010/0081059, dated Apr. 1, 2010.

Richardson, T.J. et al., "Overcharge Protection for Rechargeable Lithium Polymer Electrolyte Batteries", J. Electrochem. Soc., vol. 143, No. 12, (Dec. 1996), pp. 3992-3996 & Abstract, Accession No. 5529863, XP002087822.
Buhrmester, C. et al., "Phemothiazine Molecules—Possible Redox Shuttle Additives for Chemical Overcharge and Overdischarge Protection for Lithium-Ion Batteries", Journal of the Electrochemical Society, vol. 153, No. 2, (Dec. 23, 2005), pp. A288-A294.
JACS Articles, "Molecular Wiring of Insulators: Charging and Discharging Electrode Materials for High-Energy Lithium-Ion Batteries by Molecular charge Transport Layers", Published on Web Feb. 28, 2007, 2007 American Chemical Society.
Journal of the Electrochemical Society, 148(3) A224-A229 (2001), The Electrochemical Society, Inc., "Optimized LiFePo4 for Lithium Battery Cathodes".
Copending U.S. Appl. No. 11/921,570, filed Dec. 5, 2007, (Published as 2009/0123837, dated May 14, 2009).
Morgan.D., Li Conductivity in Li MPO Olivine Materials, Electrochemical and Solid-State Letters, pp. A30-A32 (2004).
Wang, Q., Cross Surface Ambipolar Charge Percolation in Molecular Triads on Mesoscopic Oxide Films, JACS Articles, published on Web Mar. 25, 2005, J.AM. Chem. Soc. 2005, 127, pp. 5706-5713.
Wilcox, J., "Carbon Surface Layers on a High-Rate LiFePO", Electrochemical and Solid-State Letters, pp. A360-A363 (2006).
Zhou, F., "The Electronic Structure and Band Gap of LiFePO and LiMnPO", Solid State Communications 132, pp. 181-186, (2004).
Chung, S., "Electronically conductive phosphor-olivines as lithium storage electrodes", Published online: Sep. 22, 2002, vol. 1 Oct. 2002, pp. 123-128.
Huang, H., "Approaching Theoretical Capacity of Lifepo at Room Temperature at High Rates" Electrochemical and Solid-State Letters, pp. A170-A172 (2001).
Trammell, S., "Diffusional Mediation of Surgace Electron Transfer on TiO2", J. Phys. Chem. B 1999, 103, pp. 104-107.
Tarascon, M., "Issues and challenges facing rechargeable lithium batteries", Nature, vol. 414, Nov. 15, 2001, pp. 359-367.
Evans, N., "Molecular Wiring of Insulators: Charging and Discharging Electrode Materials for High-Energy Lithium-Ion Batteries by Molecular Charge Transport Layers", J.AM. Chem. Soc. 2007, 129, pp. 3163-3167.
Harris, D. "Quantitative Chemical Analysis, Fourth Edition" W.H. Freeman and Company New York, pp. 504.
Wang, Q., "High-energy lithium batteries by molecular wiring and targeting approaches", Journal of Power Sources 174, pp. 408-413 (2007).
Bott, A., "Electrochemisty of Semiconductors" Current Separations 17:3, pp. 87-91, (1998).
Cheng, "Centre for Research in Electrochemical Science and Technology" http://www.cheng.cam.ac.uk/research/groups/electrochem/JAVA/Electrochemistry/ELEC/I, last accessed (Jul. 21, 2011).
S.J. Byrnes, "Translation guide for discussing electron energy concepts" http://sjbyrnes.com/fermiterminology.html., last accessed (Jul. 21, 2011).
Padhi, A.K., "Phospho-olivines as Positive-Electrode Materials for Rechargeable Lithium Batteries", J. Electrochem. Soc., vol. 144, No. 4, pp. 1188-1194, (Apr. 1997).
Thierry Drezen., "Effect of Particle Size on LiMnPO4 Cathodes", Journal of Power Sources 174 (2007) 949-953.
Buhrmester, C. et al., "The Use of 2,2,6,6—Tetramethylpiperinyl-Oxides and Derivatives for Redox Shuttle Additives in Li-Ion Cells" Journals of the Electrochemical Society, 153 (10) A1800-A1804 (2006).
Buhrmester, C. et al., "Studies of Aromatic Redox Shuttle Additives for LifePo 4-Based Li-Ion Cells" Journal of the Electrochemical Society, 152 (12) A2390-A2399(2005).
Barbé, C. et al., "Nanocrystalline Titanium Oxide Electrodes for Photovoltaic Applications" J. Am. Ceram. Soc., 80 (12) 3157-71 (1997).
Cha C.S. et al., "Polypyridine complexes of iron used as redox shuttles for overcharge protection of secondary lithium batteries" Journal of Power Sources 54, 255-258 (1995).

Dahn, J.R. et al., "High-Rate Overcharge Protection of LifePo 4-Based Li-Ion Cells using the Redox Shuttle Additive 2,5- Ditertbutyl-1, 4-dimethoxybenzene" Journal of the Electrochemical Society, 152 (6) A1283-A1289 (2005).

Dahn, J. et al., "The Drugstore Li-Ion Cell" The Electrochemical Society Interface, Winter 2005.

Dantsin, G. et al., "Advanced Electrolyte Salts with Inherent Overcharge Protection for Lithium Batteries" 208th ECS Meeting, Abstract # 223, copyright ECS.

Chen, G. et al., "Overcharge Protection for Rechargeable Lithium Batteries Using Electroactive Polymers" Electrochemical and Solid State Letters, 7 (2) A-23-A26 (2004).

Chen, G. et al., "Characterization of an electroactive polymer for overcharge protection in secondary lithium batteries" Electrochimica Acta 50, 4666-4673 (2005).

Exnar, I. et al., "Novel 2 rocking-chair lithium battery based on nano-crystalline titanium dioxide." Journal of Power Sources 68, 720-722 (1997).

Chen, J. et al., "Chemical Overcharge and Chemical Discharge Protection for Lithium Ion Batteries" Electrochemical and Solid State Letters, 8 (1) A-59-A62 (2005).

Schoonman, J., "Nanostructured materials in solid state ionics" Solid State Ionics 135 5-19 (2000).

Abraham, K.M. et al., "N-Butylferrocene for Overcharge Protection of Secondary Lithium Batteries" J. Electrochem. Soc., vol. 137, No. 6, Jun. 1990.

Kavan, L. et al., Lithium Insertion into Zirconia—Stabilized Mesoscopic TiO2 (Anatase) Journal of the Electrochemical Society 147 (8) 2897-2902 (2000).

Kavan, L. et al., "Lithium Storage in Nanostructured TiO2 Made by Hydrothermal Growth" Chem. Mater. 16, 477-485, 2004.

Xiao, L.F., "A Composite Polymer Membrane with reversible overcharge protection mechanism for lithium ion batteries" Electrochemistry Communications 7, 589-592 (2005).

Adachi, M. et al., "Aromatic Compounds as Redox Shuttle Additives for 4 V Class Secondary Lithium Batteries" Journal of the Electrochemical Society 146 (4), 1256-1261 (1999).

Wagemaker, M., "Equilibrium lithium transport between nanocrystalline phases in intercalated TiO2 anatase" Nature vol. 418-397, 2002.

Nishijima, M. et al., "Li Deintercalation-Intercalation Reaction and Structural Change in Lithium Transition Metal Nitride, Li7MnN54" J. Electrochem. Soc., vol. 141 No. 11, 1994.

Golovin, M.N. et al., "Applications in Metallocenes in Rechargeable Lithium Batteries for Overcharge Protection" J. Electrochem. Soc., vol. 139 No. 1, 1992.

Poizot, P. et al., "Nano-sized transition metal oxides as negative-electrode materials for Lithium-ion batteries" Nature vol. 407 (2000).

Wang, R.L., "Calculations of oxidation Potentials of Redox Shuttle Additives for Li-Ion Cells" Journal of the Electrochemical Society, 153 (2) A445-A449 (2006).

Han, S.C., "Reversible Formation and Decomposition of LiF Clusters Using Transition Metal Fluorides as Precursors and Their Application in Rechargeable Li Batteries" 351 273 (2003).

Narayanan, S.R., "Analysis of Redox Additive-Based Overcharge Protection for Rechargeable Lithium Batteries" J. Electrochem. Soc., vol. 138 No. 8, 1991.

Huang, S.Y., "Rocking Chair Lithium Battery Based on Nanocrystalline TiO2 (Anatase)" J. Electrochem. Soc., vol. 142 No. 9, 1995.

Tran-Va F. et al., "Dihydrophenazine derivatives for Overcharge Protection of Rechargeable Lithium Batteries" Electrochimica Acta 44 2789-2792 (1999).

Pralong, V., "Reversible Lithium uptake by CoP3 at low potential: role of the anion" Electrochemistry Communications 4, 516-520 (2002).

Watanabe, Y. et al., "Electrochemical properties of aryladamantanes as new overcharge protection compounds for lithium cells" Journal of Power Sources 154, 246-254 (2006).

Guo, Yu-Guo et al., "Synthesis of hierarchically mesoporous anatase spheres and their application in lithium batteries" Chem Comm 2783-2785 (2006).

Department of Chemistry and Biochemistry, "The Fermi Level and the Redox Potential", J. Phys. Chem. 89, 3789-3791, (1985).

* cited by examiner

LITHIUM MANGANESE PHOSPHATE POSITIVE MATERIAL FOR LITHIUM SECONDARY BATTERY

This application is the U.S. national phase of International Application No. PCT/IB2006/050483, filed 14 Feb. 2006, which designated the U.S., the entire contents of each of which are hereby incorporated by reference.

FIELD OF THE INVENTION

The present invention relates to the positive lithium insertion electrode for lithium ion battery and in particular, to the different steps required to make lithium manganese phosphate electrochemically active.

BACKGROUND OF THE INVENTION

Insertion compounds are those that act as a solid host for the reversible insertion of guest atoms. Cathode materials that will reversibly intercalate lithium have been studied extensively in recent years for use as electrode materials in advanced high energy density batteries and they form the cornerstone of the emerging lithium-ion battery industry. Lithium-ion batteries have the greatest gravimetric (Wh/kg) and volumetric (Wh/L) energy densities of currently available conventional rechargeable systems (i.e., NiCd, NiMH, or lead acid batteries) and represent a preferred rechargeable power source for many consumer electronics applications. Additionally, lithium ion batteries operate around 3.6 volts enabling a single cell to operate in the correct voltage window for many consumer electronic applications.

Lithium ion batteries use two different insertion compounds: for the active cathode and for the anode materials. In a lithium-ion battery, lithium is extracted from the cathode material while lithium is concurrently inserted into the anode on charge of the battery. Lithium atoms travel, or "rock", from one electrode to the other in the form of ions dissolved in a non-aqueous electrolyte. The associated electrons travel in the circuit external to the battery. Layered rock-salt compounds such as $LiCoO_2$ and $LiNiO_2$(1) are proven cathode materials. Nonetheless, Co and Ni compounds have economic and environmental problems that leave the door open for alternative materials.

$LiMn_2O_4$ is a particularly attractive cathode material candidate because manganese is environmentally benign and significantly cheaper than cobalt and/or nickel. $LiMn_2O_4$ refers to a stoichiometric lithium manganese oxide with a spinel crystal structure. A spinel $LiMn_2O_4$ intercalation cathode is the subject of intense development work (2), although it is not without faults. The specific capacity obtained (120 mAh/g) is 15-30% lower than $Li(Co,Ni)O_2$ cathodes, and unmodified $LiMn_2O_4$ exhibits an unacceptably high capacity fade. Several researchers have stabilized this spinel by doping with metal or alkali cations (3,4). While the dopants successfully ameliorated the capacity decline, the initial reversible capacity is no better than 115 mAh/g, and the running voltage of the cell is no better than the usual 3.5 V.

Recently, olivine-structured $LiMPO_4$ where M=Fe, Mn, Co, Cu, V have been gaining interest as candidate materials for rechargeable lithium batteries (5,6 & Goodenough patent). They have a theoretical capacity of up to 170 mAh/g, which would increase the energy density compared to $LiCoO_2$ or $LiMn_2O_4$.

In particular Lithium iron phosphate ($LiFePO_4$) has established its position as a potential next generation cathode material. $LiFePO_4$ has advantages in terms of material cost, chemical stability and safety. However, the $Fe^{3+}/Fe^{2+}$ couple in $LiFePO_4$ has a significantly lower voltage (3.45V versus $Li/Li^+$) when compared to the (4.05 V versus $Li/Li^+$) in the standard $LiCoO_2$ based lithium ion batteries and this lowers the energy available for the $LiFePO_4$ system. In addition $LiFePO_4$ has low electronic conductivity which leads to initial capacity loss and poor rate capability associated with diffusion-controlled kinetics of the electrochemical process. Morphological modification at the nano-scale level appears to be the best tool to control these undesired phenomena.

The use of olivine type $LiMnPO_4$ would also be of interest because of the position of the $Me^{3+}/Mn^{2+}$ couple which creates a potential of 4.05V versus $Li/Li^+$ which is compatible with the present $LiCoO_2$ based lithium ion batteries. However $LiMnPO_4$ is an insulator with ca. 2 eV spin exchange band gap and this significantly lowers the electrochemical activity compared to $LiFePO_4$ which is a semiconductor with ca. 0.3 eV crystal field band gap. Furthermore the two-phase $Mn^{3+}/Mn^{2+}$ redox character also prohibits the introduction of mobile electrons or holes into the band.

Sol-gel processing can control the structure of the material on a nanometer scale from the earliest stages of processing. This technique of material synthesis is based on some organometallic precursors, and the gels may form by network growth from an array of discrete particles or by formation of an interconnected 3-D network by the simultaneous hydrolysis and polycondensation of organometallic precursors.

Based on thermodynamics and kinetics that govern the precipitation of pure phosphate phases. Delacourt et al. (6, 8) described a low-temperature preparation of optimised phosphates.

Dominko et al. synthesized micro-sized porous $LiMnPO_{4/C}$ composite (where M stands for Fe and/or Mn) using a sol-gel technique (9). However, the materials obtained via these "chimie douce" methods, gave disappointing electrochemical performances –70 mAh/g at C/20 are the maximum obtained.

The origin of this poor performance is ascribed to both slow Li diffusion in the solid phase and a poor electronic and/or ionic conductivity of the material. (Delacourt, C; Laffont, L; Bouchet, R; Wurm, C; Leriche, J B; Morcrette, M; Tarascon, J M: Masquelier, C. Journal of the electrochemical society (2005), 152 (5): A913-A921)

A novel approach is required that addresses these issues concurrently, if higher performances are to be achieved.

SUMMARY OF THE INVENTION

The primary object of the invention is to obtain $LiMnPO_4$ of an excellent crystallinity and a high purity via a "chimie douce" reaction and low sintering temperatures. In order to achieve the above object, the invention is a method for manufacturing lithium manganese phosphate ($LiMnPO_4$). As such the primary object of the invention is to describe a synthetic preparation method. More particularly, the primary object of the present invention is to provide a sol-gel synthesis route resulting in a pure well-crystallised phase of $LiMnPO_4$.

According to an embodiment of the present invention, by covering surfaces of the particles of lithium manganese phosphate ($LiMnPO_4$) with acetylene black by high-energy milling, the electrochemical properties of the material as a positive electrode in Lithium ion battery are improved.

The third object of the invention is to describe an electrode preparation of the lithium manganese phosphate/carbon composite. This process is very important to reach the correct electrochemical performances.

BRIEF DESCRIPTION OF THE DRAWING

The present invention will be described in detail with reference to the drawing showing the preferred embodiment of the present invention, wherein.

DETAILED DESCRIPTION OF THE INVENTION

Hereinafter, a method for manufacturing lithium manganese phosphate (LiMnPO$_4$) according to the invention and a method for manufacturing a positive electrode active material will be detailed.

A. Method for Manufacturing LiMnPO.sub..4

Firstly, a method for manufacturing LiMnPO$_4$ according to the invention will be described. The present invention discloses sol gel methods to prepare lithium manganese phosphate (LiMnPO$_4$). LiMnPO$_4$. The success of the alkoxides as precursors of the sol-gel process is their facility to undergo hydrolysis because the hydrolysis is the main step in the transformation of alkoxides to oxides. All metals are capable of forming an alkoxide in which an alkyl group is bonded to the metal by means of oxygen atom.

The choice of the alkyl group may be made according to availability, but one must be careful because the reaction rate varies throughout the process depending on the alkyl group used. The method for manufacturing LiMnPO$_4$ according to the invention is a method of obtaining LiMnPO$_4$ by carrying out the steps of mixing and gel formation, drying and calcination.

Hereinafter, the respective steps in the invention will be detailed.

1. Mixing Formation

The present invention discloses sol-gel methods to prepare lithium manganese phosphate (LiMnPO$_4$). Most sol-gel processes are preferably accomplished in a common solvent. Water is the solvent chosen in this system. A mixing of different optimised precursors together is done in the solvent. The final solution should be stirred long enough to ensure homogeneity. Hydrolysis and polycondensation reactions of metal alkoxides lead to the formation of metal oxides. The fundamental chemical process involved in this processing is influenced by several parameters, which allow the control of homogeneity and the nanostructure of the derived materials.

A hydrolysis-condensation reaction must take place: precursors of metal alkoxides will be hydrolysed in presence of water. Lithium acetate dihydrate (C$_2$H$_3$O$_2$Li,(H$_2$O)), manganese (II) acetate tetrahydrate (C$_4$H$_6$O$_4$Mn,H$_2$O) and ammonium dihydrogen phosphate (H$_6$NO$_4$P) are used as precursors. The starting materials were dissolved in distilled water at room temperature. The mixing of precursors is done in this order manganese (II) acetate tetrahydrate (C$_4$H$_6$O$_4$Mn, (H$_2$O)$_4$), lithium acetate dihydrate (C$_2$H$_3$O$_2$Li, (H$_2$O)$_2$) and ammonium dihydrogen phosphate (H$_6$NO$_4$P).

Hydrolysis rates of highly reactive alkoxides can be control by using chelating organic ligands such as organic acids. In one embodiment a chelating agent is added during the mixing step. The chelating agent used is an organic acid, preferably a weak acid having a pK$_a$ value in the range of from about 1.0 to about 5.0. The organic acid is selected from the group consisting of acetic acid, ascorbic acid, benzoic acid, citric acid, lactic acid, malic acid, malonic, acid, oxalic acid, salicylic acid, glycolic acid, tartaric acid and mixtures thereof. Preferably, the organic acid is selected from the group consisting of acetic acid, glycolic acid, citric acid, oxalic acid and tartaric acid. The formation of the metal complex with a multidentated ligand will decrease the hydrolysis rate. As chelating agents glycolic acid (C$_2$H$_4$O$_3$), oxalic acid (C$_2$H$_2$O$_4$), citric acid (C$_6$H$_8$O$_7$), etc were used.

After the addition of the chelating agent the pH is adjusted in a range of 1.5 to 4.5, (initial pH is 4.5). In addition to water, an acid can also be used to hydrolyse the solution. HNO$_3$ is used to acidify the solution from pH 4.5 to 1.5. After the addition of the chelating agent the pH is more preferably adjusted to 2.0. This solution was further heated to 60-90° C. to form the gel. The gel is stabilized by a drying process at 80° C. for 12 to 48 hours, followed by drying at 120° C. for 6 to 24 hours.

2. Drying Process

Once the solution has been condensed into a gel, solvent removal must be carried out. Drying is the term used for the removal of solvent. After drying, a porous and homogeneous aerogel is obtained. Once the gel has been dried, a sintering step is needed to collapse the pore structure and solidify the gel. This gel was dried 14 hours at 80° C. and 10 hours at 120° C. under air.

3. Thermal Decomposition

In this step, the complex decompositions of organic precursor take place, and the organic substances added for the preparation of the gel are almost completely removed, leading to amorphous powders. DTA-TGA experiments are performed to study the decompositions of organic precursors, from which one can determine a minimal calcination temperature A pre-calcination step is done on the gel at 350° C. for several hours, preferably from 1 hour to 6 hours to remove most of the organics present in the gel. In the case of LiMnPO$_4$ sol-gel synthesis the temperature is fixed at 350° C.

4. Sintering

Figure 1:
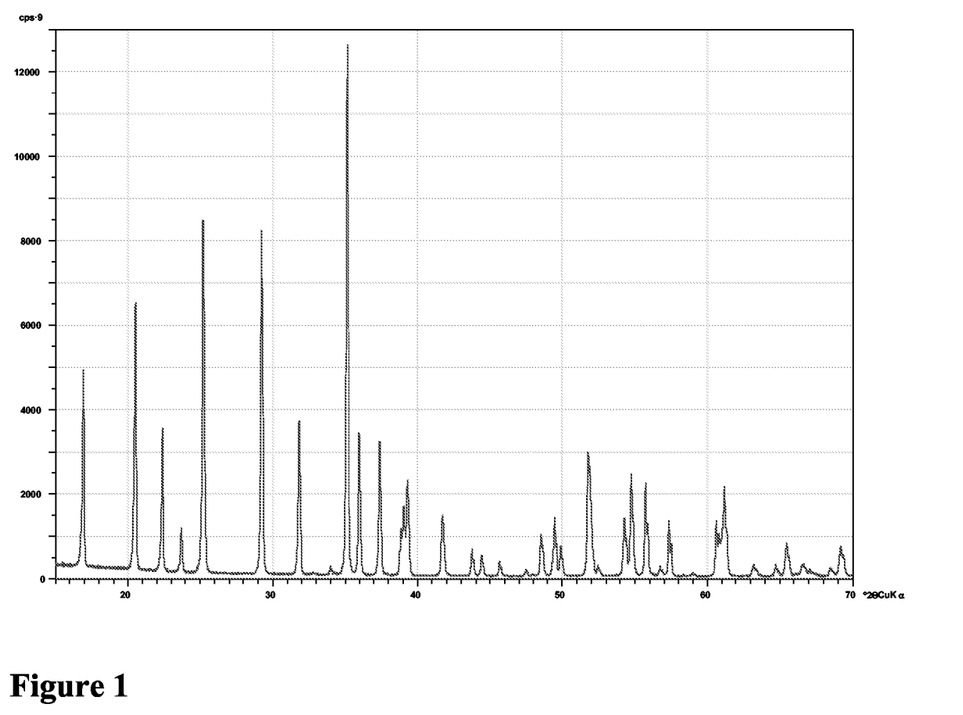
FIG. 1 shows an X-ray diffraction pattern of the Lithiophilite Lithium Manganese Phosphate (LiMnPO$_4$) disclosed in the present invention.
Figure 2:
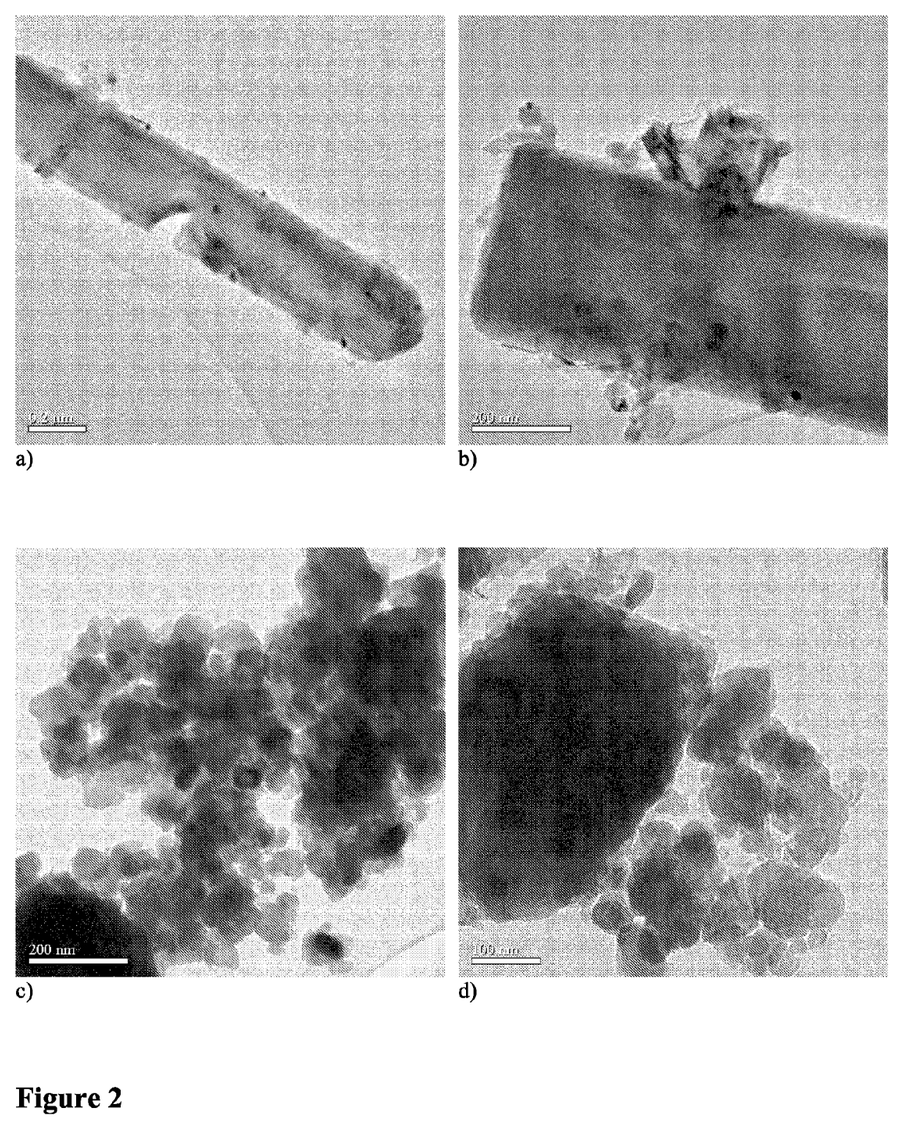
FIG. 2 shows the TEM pictures in bright field of a LiMnPO$_4$ as prepared (a, b) and well-coated composite LiMnPO$_{4/C}$ (c and d).
Figure 3:
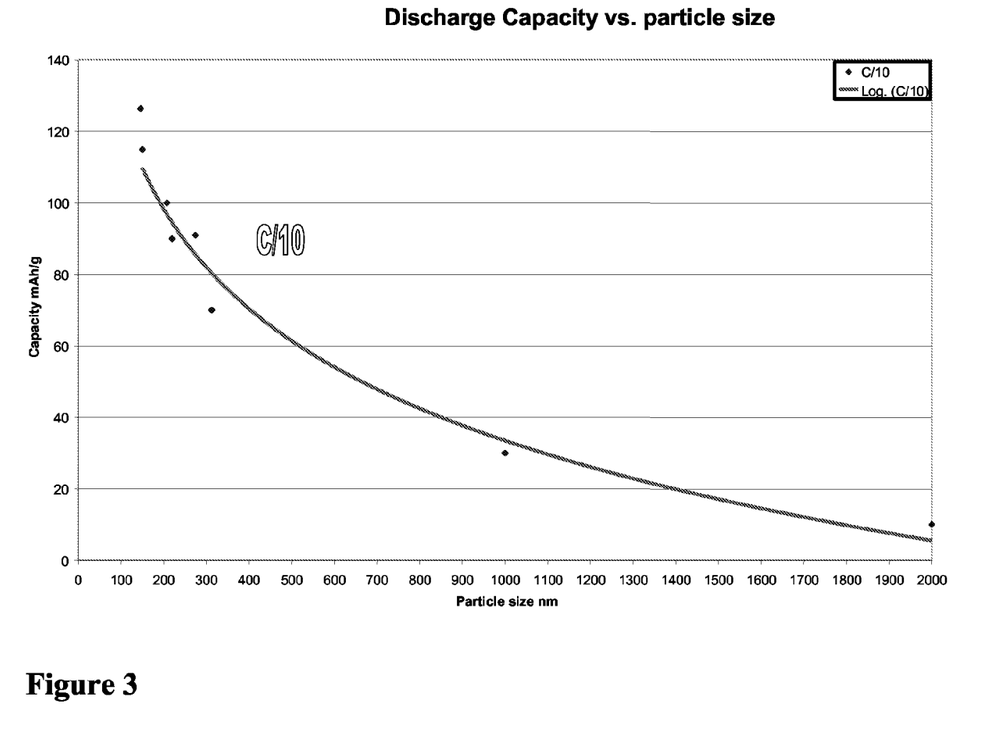
FIG. 3 shows dependence of the discharge capacities versus particle size (charge is done at constant current at C/10 and discharge is done at constant current at C/10).
Figure 4:
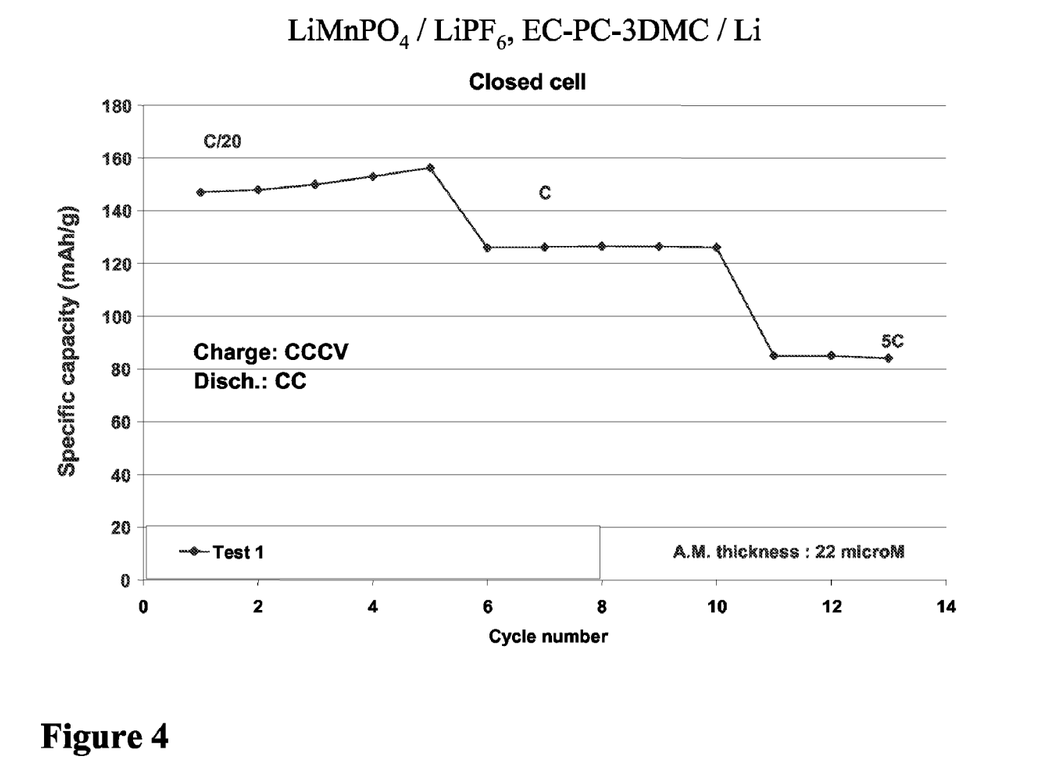
FIG. 4 shows specific discharge capacities using CCCV charging method described in FIG. 3.

During calcination, pore-formation occurs via a process of particle bonding by thermal energy. The driving force behind sintering is a reduction in the surface area. The calcination step is required to obtain the desired crystallinity. The powder was heated at different temperatures (400-900° C.) from 1 to 5 hours in air. Preferably the temperature of calcination is between 450° C. and 600° C. The resulting powder was ground in a mortar and characterised by X-ray diffraction study. Measuring the cell parameters of the orthorhombic structure indicates measurements as follow: a=10.4539(6)A, b=6.1026(4)A, c=4.7469(3)A. The specific surface area is about 7 to 20 m$_{2/g}$ (Particle size is about 260 to 90 nm).

B. Method for Manufacturing a Positive Electrode Active Material

Next, a method for manufacturing a positive electrode active material according to the invention will be described. The method for manufacturing the positive electrode active material according to the invention is characterized by blending a conductive agent with the LiMnPO$_4$ obtained according to the above method for manufacturing the LiMnPO$_4$ and LiMnPO$_4$ used in the invention, being obtained according to a manufacturing method described in the "A. Method for manufacturing LiMnPO$_4$", is omitted from describing here.

Furthermore, the conductive agent used in the invention, as far as it can improve the electrical conductivity, is not particularly restricted. For instance, graphite or carbon black such as acetylene black can be cited.

The conductive agent is added in the range of 5 to 25 parts by weight, preferably in the range of 10 to 20 parts by weight to 100 parts by weight of $LiMnPO_4$. When an amount of the conductive agent is less than necessary, the electrical conductivity may not be sufficiently improved, and, when it is more than necessary, since an amount of $LiMnPO_4$ becomes relatively less, the performances as the positive electrode active material may be deteriorated. In the invention, a method of blending the $LiMnPO_4$ and the conductive agent is not particularly restricted. However, for instance, the physical blending is preferable and the mechanical blending is particularly preferable. Specifically, a ball mill pulverizing method or the like can be cited. Furthermore, applications of the positive electrode active material obtained according to the invention are not particularly restricted. However, it can be used in, for instance, lithium secondary batteries.

The present invention discloses improved electrochemical performances of $LiMnPO_4$/carbon composite. This composite was obtained by high energy milling of $LiMnPO_4$ with acetylene black in a stainless steel container using a planetary ball mill for several hours.

The present invention also discloses electrode preparation of $LiMnPO_{4/c}$ composite to improve electrochemical performances. Electrode of $LiMnPO_4/C$ active material was prepared by mixing of the active material (composite) with a carbon black and a binder in N-methyl-2-pyrrolidinon. The slurry was then coated on an aluminium foil, serving as the current collector. The N-methyl-2-pyrrolidinon was subsequently evaporated in air on titanium hot plate.

EXAMPLES

Hereinafter, the invention will be more specifically described with reference to examples.

Example 1

In 300 mL of distilled water,
0.03 mol of Manganese (II) acetate tetrahydrate $(C_4H_6O_4Mn,(H_2O)_4)$
0.03 mol of Lithium acetate dihydrate $(C_2H_3O_2Li\ (H_2O)_2)$
0.12 mol of Glycolic acid (Hydroxyacetic acid—$C_2H_4O_3$)
0.03 mol of Ammonium di-hydrogeno phosphate $(H_5NO_4)$
were dissolved under magnetic stirring at room temperature. PH of the solution was adjusted to 2 by using concentrated nitric acid $(HNO_3)$. The solution was stirred under magnetic stirring and heated to 80° C. in an oil bath until formation of a green-ish coloured gel was achieved. The gel was dried, under air, overnight at 80° C. and one day at 120° C. in an oven. The powder was then heated at 350° C. for 5 hours under air prior to being further heated at different temperatures (450-800° C.) for 3 hours in air.

X-ray spectrum of this material indicates a pure phase of lithium manganese phosphate (LiMnPO.sub.4).

Example 2

The powder of $LiMnPO_4$ was placed in a 250 mL stainless steel container and ball milled with a planetary ball mill using 9 stainless steel balls of 20 mm diameter for one hour. In addition, 20% in weight of acetylene black was added to the milled $LiMnPO_4$ and ball milled again for 3 hours. A composite of $LiMnPOd_{4/C}$ was then obtained.

Example 3

A positive electrode composition of $LiMnPO_{4/C}$ active material was prepared by mixing of the active material (composite) with a carbon black (C55 from Shawinigan) and a binder (polyvinylidene difluoride—PVDF) with the mass ratio (90:5:5), in N-methyl-2-pyrrolidinon. The slurry was then coated on an aluminium foil, serving as the current collector. The N-methyl-2-pyrrolidinon was subsequently evaporated in air at 100° C. for 1 hour and 120° C. for 30 minutes on titanium hot plate. The electrode was then dry at 160° C. overnight under vacuum.

Example 4

The positive electrode of example 3 was tested in standard laboratory Swagelok test cells versus Li metal. Microporous Celgard membrane served as separator. The electrolyte was made of IM of $LiPF_6$ dissolved in a 1:1:3 by volume mixture of dried and purified propylene carbonate (PC), ethylene carbonate (EC) and dimethyl carbonate (DMC). The electrochemical properties of $LiMnPO_{4/C}$ electrodes were measured using an Arbin BT 2000 electrochemical measurement system by galvanostatic charge/discharge and cyclic voltammetry.

The battery prepared above was charged under a current density of 0.03 $mA/cm_2$ until a termination voltage of 4.7 volt was reached. Then the charged battery was discharged at a current density of 0.03 $mA/cm_2$ until a termination voltage of 2.3 volt was reached.

Example 5

In 300 mL of distilled water,
0.03 mol of Manganese (II) acetate tetrahydrate $(C_4H_6O_4Mn\ (H_2O)_4)$
0.03 mol of Lithium acetate dihydrate $(C_2H_3O_2Li, (H_2O)_2)$
0.03 mol of Glycolic acid (Hydroxyacetic acid—$C_2H_4O_3$)
0.03 mol of Ammonium di-hydrogeno phosphate $(H_6NO_4P)$
were dissolved under magnetic stirring at room temperature. PH of the solution was 4.3. The solution was stirred under magnetic stirring and heated to 80° C. in an oil bath until formation of a brownish gel is achieved. The gel was dried, under air, over night at 80° C. and one day at 120° C. in an oven. The powder was then heated at 350° C. for 5 hours under air prior to being further heated at different temperatures (400-900° C.) for 3 hours in air.

X-ray spectrum of this material indicates a pure phase of lithium manganese phosphate ($LiMnPO_4$).

The composite $LiMnPO_{4/C}$, cell preparation and test conditions were performed according Example 2, 3 and 4.

Example 6

In 300 mL of distilled water,
0.03 mol of Manganese (II) acetate tetrahydrate $(C_4H_6O_4Mn,(H_2O)_4)$
0.03 mol of Lithium acetate dihydrate $(C_2H_3O_2Li, (H_{20}))_2$
0.12 mol of Glycolic acid (Hydroxyacetic acid—$C_2H_4O_3$)
0.03 mol of Ammonium di-hydrogeno phosphate $(H_6NO_4P)$ were dissolved under magnetic stirring at room temperature. PH of the solution was adjusted to 2 by using concentrated nitric acid ($HNO_3$). The solution was stirred under magnetic stirring and heated to 80° C. in an oil bath until the formation of a greenish gel was achieved. The gel was dried, under air, over night at 80° C. and one day at 120° C. in an oven. The powder was then heated at 350° C. for 5 hours under air prior to being further heated at different temperatures (450-800° C.) for 3 hours in air.

X-ray spectrum of this material indicates a pure phase of lithium manganese phosphate ($LiMnPO_4$).

The composite $LiMnPO_{4/C}$, cell preparation and test conditions were performed according to those in Example 2, 3 and 4.

Example 7

In 300 mL of distilled water,
0.03 mol of Manganese (II) acetate tetrahydrate ($C_4N_64Mn(H_2O)_4$)
0.03 mol of Lithium acetate dihydrate ($C_2H_3O_2Li,(H_2O)_2$)
0.06 mol of citric acid ($C_6H_8O_7$)
0.03 mol of Ammonium di-hydrogeno phosphate ($H_6NO_4P$)
were dissolved under magnetic stirring at room temperature. PH of the solution was adjusted to 2 by using concentrated nitric acid ($HNO_3$). The solution was stirred under magnetic stirring and heated to 80° C. in an oil bath until the formation of a greenish gel was achieved. The gel was dried, under air, over night at 80° C. and one day at 120° C. in an oven. The powder was then heated at 350° C. for 5 hours under air prior to being further heated at different temperatures (450-800° C.) for 3 hours in air.

X-ray spectrum of this material indicates a pure phase of lithium manganese phosphate ($LiMnPO_4$).

The composite $LiMnPO_{4/C}$, cell preparation and test conditions were performed according to those in Example 2, 3 and 4.

Example 8

In 300 mL of distilled water,
0.03 mol of Manganese (II) acetate tetrahydrate ($C_4H_6O_4Mn,(H_2O)_4$)
0.03 mol of Lithium acetate dihydrate ($C_2H_3O_2Li,(H_2O)_2$)
0.06 mol of oxalic acid ($C_2H_2O_4$)
0.03 mol of Ammonium di-hydrogeno phosphate ($H_6NO_4P$)
were dissolved under magnetic stirring at room temperature. PH of the solution was adjusted to 2 by using concentrated nitric acid $HNO_3$). The solution was stirred under magnetic stirring and heated to 80° C. in an oil bath until the formation of a greenish gel was achieved.

The gel was dried, under air, over night at 80° C. and one day at 120° C. in an oven. The powder was then heated at 350° C. for 5 hours under air prior to being further heated at different temperatures (450-800° C.) for 3 hours in air.

X-ray spectrum of this material indicates a pure phase of lithium manganese phosphate ($LiMnPO_4$).

The composite $LiMnPO_{4/C}$, cell preparation and test conditions were performed according to those in Example 2, 3 and 4.

REFERENCES

1. K. Mizushima, P. C. Jones, P. J. Wiseman, and J. B. Goodenough, Mat. Res. Bull., 15, 783 (1980).
2. M. M. Thackeray, Progress in Batteries and Battery Materials, Vol. 14, R. J. Brodd, ed., ITE Press, Inc., Brunswick, Ohio, p. I (1995), and references therein
3. Thackeray and Gummow, U.S. Pat. No. 5,316,877, 1994.
4. Zhong and Bondakdarpour, U.S. Pat. No. 5,631,104, 1997.
5. Padhi, A. K; Nanjudaswamy, K. S.; Goodenough, J. B. JES 1997, 144 (4) 1188
6. C Delacourt; P. Poizot; M. Morcrette; J.-M. Tarascon and C. Masquelier Chem. Mater. 2004, 16, 93-99
7. Masao Yonemura, Atsuo Yamada, Yuki Takei, Noriyuki Sonoyama and Ryoji Kanno, JES 151 (9), A1352-A1356 (2004)
8. A. Yamada, S. C. Chung and K. Hinokuma, JES 148, A224 (2001)
9. C. Delacourt, C. Wurm, P. Reale, M. Morcrette and C. Masquelier, Solid State ionics 173 (2004) 113-118
10. R. Dominko, M. Bele, M. Gaberscek, M. Remskar, D. Hanzel, J. M. Goupil, S. Pejovnik and J. Jamnik, Journal of power sources (2005)
11. Delacourt, C; Laffont, L; Bouchet, R; Wurm, C; Leriche, JB; Morcrette, M; Tarascon, J M; Masquelier, C. Journal of the electrochemical society (2005), 152 (5): A913-A921

The invention claimed is:

1. A process for the production of electro-active nanostructured olivine lithium manganese phosphate in the form of particles including the steps of mixing and gel formation, drying and calcination characterized in that the mixing of precursors is done in this order manganese (II) acetate tetrahydrate, lithium acetate dihydrate and ammonium dihydrogen phosphate.

2. A process according to claim 1, wherein a chelating agent is added during the mixing step and the chelating agent used is an organic acid having a $pK_a$ value in the range of from about 1.0 to about 5.0 selected from the group consisting of acetic acid, ascorbic acid, benzoic acid, citric acid, lactic acid, malic acid, malonic, acid, oxalic acid, salicylic acid, glycolic acid, tartaric acid and mixtures thereof.

3. A process according to claim 2 characterized in that the concentration of the chelating agent is 1 to 10 times the concentration of the manganese precursor on a mole basis.

4. A process according to claim 3 characterized in that after the addition of the chelating agent the pH is adjusted in a range of 1.5 to 4.

5. A process for the production of electro-active nanostructured olivine lithium manganese phosphate in the form of particles including the steps of mixing and gel formation, drying and calcination, wherein a chelating agent is added during the mixing step and the chelating agent used is an organic acid having a $pK_a$ value in the range of from about 1.0 to about 5.0 selected from the group consisting of acetic acid, ascorbic acid, benzoic acid, citric acid, lactic acid, malic acid, malonic, acid, oxalic acid, salicylic acid, glycolic acid, tartaric acid and mixtures thereof.

6. A process according to claim 5 wherein the particle size is in the range 90-300 nm.

7. A process according to claim 6 wherein the particle size is in the range 90-150 nm.

8. A process according to claim 5 wherein the organic acid is selected from the group consisting of acetic acid, glycolic acid, citric acid, oxalic acid and tartaric acid.

9. A process according to claim 5 characterized in that the concentration of the chelating agent is 1 to 10 times the concentration of the manganese precursor on a mole basis.

10. A process according to claim 9 wherein the concentration of the chelating agent is comprised in the range of 4 to 6 times the concentration of the manganese precursor on a mole basis.

11. A process according to claim 5 characterized in that after the addition of the chelating agent the pH is adjusted in a range of 1.5 to 4.5.

12. A process according to claim 11 wherein, after the addition of the chelating agent the pH is adjusted to 2.0.

13. A process according to claim 5 characterized in that the gel is stabilized by a drying process at 80° C. for 12 to 48 hours followed by drying at 120° C. for 6 to 24 hours.

14. A process according to claim 5 characterized in that a pre-calcination step is done on the gel at 350° C. for several hours to remove most of the organics present in the gel.

15. A process according to claim 5, characterized in that the calcination step is done on the gel from 400° C. to 900° C. for 1 to 5 hours.

16. A process according to claim 15 wherein the temperature of calcination is between 450° C. and 600° C.

17. An electrode material prepared by the process according to claim 5, further comprising the step of ball milling the nanostructured olivine lithium manganese phosphate with carbon to produce lithium manganese phosphate/carbon composite having a particle size in the range of 90 to 150 nm and carbon covering the surface of the nanostructured olivine lithium manganese phosphate.

18. An electrode material according to claim 17 wherein the carbon is acetylene black.

19. An electrode material according to claim 17 wherein the carbon concentration is 1-30 ww %.

20. A electrochemical cell comprising a cathode, an anode and an electrolyte wherein the cathode is made from a material according to claim 17.

* * * * *

UNITED STATES PATENT AND TRADEMARK OFFICE
CERTIFICATE OF CORRECTION

| | | |
|---|---|---|
| PATENT NO. | : 8,133,616 B2 | Page 1 of 1 |
| APPLICATION NO. | : 12/279469 | |
| DATED | : March 13, 2012 | |
| INVENTOR(S) | : Ivan Exnar et al. | |

It is certified that error appears in the above-identified patent and that said Letters Patent is hereby corrected as shown below:

In Col. 8, line 43, Claim 4
replace "4."
with "4.5."

Signed and Sealed this
First Day of May, 2012

David J. Kappos
*Director of the United States Patent and Trademark Office*